United States Patent Office 3,697,447
Patented Oct. 10, 1972

3,697,447
CATALYTIC OXIDATION UNIT COMPRISING A FLUID PERMEABLE BODY OF FIBROUS ADMIXTURE
Edward Robert Bettinardi, New York, N.Y., assignor to Johns-Manville Corporation, New York, N.Y.
No Drawing. Filed May 7, 1969, Ser. No. 822,732
Int. Cl. B01j 11/06, 11/08
U.S. Cl. 252—458                    15 Claims

ABSTRACT OF THE DISCLOSURE

A catalyst oxidation burner unit for the flameless combustion of gaseous carbonaceous fuel comprising a gas permeable, composite fiber porous body of an intimate admixture of asbestos fiber and ceramic type refractory fiber containing a deposited metal catalyst.

BACKGROUND OF THE INVENTION

This invention is concerned with catalytic means of effecting flameless combustion of gaseous carbonaceous fuels comprising passing a vaporized fuel in contact with catalytically active metal and is directed to improved thermally enduring structures for more efficient concentrated deployment of increased amounts of catalytic metal and in turn increased gas contact therewith.

SUMMARY OF THE INVENTION

This invention comprises means or structure including composite fiber materials, for dispersing more effective amounts of catalytically active metal and fixing it within a very open fluid permeable medium for optimum contact and catalytic effect with gaseous fuels to be passed therethrough, and provides improved metal catalysts retention capacity with structural integrity and thermal resistance. This invention constitutes the discovery that a composite of asbestos fiber and a refractory ceramic siliceous fiber intimately admixed and joined together in an open, highly porous structure provides an improved medium for dispersing and carrying catalytically active metal for flameless combustion of vaporized carbonaceous fuel.

It is the primary objective of this invention to provide a high temperature enduring porous structure or media of extensive internal surface area which permits easy transmission of fluid therethrough while being highly receptive to and retaining substantial amounts of metal catalysts and enables the concentrated deployment of metal catalysts within areas of maximum catalytic combustion effectiveness.

DESCRIPTION OF THE PREFERRED EMBODIMENT

The improved catalyst oxidation burner units of this invention constitutes highly porous composite fiber bodies with the combined fiber content fixed in an open array structure permitting easy fluid penetration and transfusion at relatively low pressure differentials, comprising an intimate admixture of asbestos fiber and refractory ceramic siliceous fiber such as refractory alumina-silica fiber with the fiber containing or carrying thereon an appropriate metal catalyst. Preferably, for maximum effectiveness, the asbestos fiber content of the composite should be concentrated primarily adjacent to the exposed surface of the body whereon combustion is to be effected since the greatest surface area of asbestos fiber for reception and retention of the metal catalyst enables the consolidation of the deposited catalytic material within or about the immediate area of the active combustion face of the unit.

The composite fiber porous bodies possessing a high level of fluid permeability of this invention are most expediently formed by means of wet filter molding which procedure of forming operation is amenable to producing most all appropirate unit configurations and thicknesses, the control or attainment of paraticular fiber disposition or concentration, degree of structural openness or porosity, etc. Typical wet filter molding procedures comprise dispersing the fibers in water and including therewith any other ingredients to be contained, such as binders, pore forming fugitive fillers or material, etc., producing a dilute slurry or suspension of such material, and filter molding therefrom by passing the liquid phase of the slurry through a screen or other perforated mold and thereby uniformly accumulating the admixed solids content including the fibers into intermeshed fibrous mass as a layer over the face of the mold which is provided in apt configuration and dimensions. Vacuum means or other application of a pressure differential is usually necessary to instigate and/or accelerate the filter molding operation to render it economically practical timewise. Moreover, this type of forming procedure is amenable to controlling the relative fiber concentration or content transverse through the thickness of the unit by applying the mold to and filtering sequentially from two or more distinct supplies of slurries with appropriately different fiber contents or proportions thereof, or other variations in ingredients. For example the combustion surface and immediate adjacent area of the burner unit can be formed by filtering from a slurry with equal parts by weight of asbestos and ceramic fiber to provide an apt thickness thereof and then from a slurry of only ceramic fiber to complete the unit, or from a slurry composed of about 75% to 90% asbestos fiber and about 25% to 10% ceramic fiber by weight for the combustion side of the unit and thereafter conversely a slurry of about 25% to 10% asbestos and about 75% to 90% ceramic fiber by weight, or with whatever proportions are most expedient under the circumstances of the designed use considering the most effective operation for a given catalyst and given fuel.

Although filter molding is preferred, it being the most effective and versatile method, composite fiber porous body burner units can be produced by other means, including for example admixing the fibers and any other components with a limited amount of liquid to provide a plastic-like consistency, then conforming to shape through molding and drying, or simply dry mixing the fibers as by air suspending and intermingling the suspended fibers to blend them, collecting and compressing to shape.

Fibrous components, other than the asbestos fiber of the composite fiber body, consists of refractory ceramic type fiber of siliceous compositions, preferably commercial alumina-silica refractory fiber composed of approximately equal parts of alumina and silica. However, other refractory type fibers may suffice comprising silica fiber, a high temperature resistant fiber produced either by fiberizing molten quartz or by leaching with acid the metal oxides from conventional glass fiber materials leaving substantially only the silica residue. Other siliceous composition fibers include those formed of silicates of calcium, aluminum and the like di- or trivalent metals having appropriate thermal resistance. The preferred alumina-silica fiber is commercially available as such, or as modified by small amounts of oxides as for example titania, zirconia, or chromia, etc.

The inclusion of a suitable high temperature binder is definitely preferred to provide a self-supporting structure and to maintain the integrity of the composite fiber body unit over all temperature conditions and to resist damage due to rough or abusive usage without support or reinforcement. An optimum binder comprises a colloidal alumina such as described in U.S. Pat. No. 2,915,475 and sold by E. I. du Pont under the trade name of Baymal. Other potential high temperature binders comprise bentonite clay, aluminum phosphates or other metal phosphate salts, borax, etc. The binder component is preferably admixed with the fibers prior to forming, if expedient, for example dispersed in the slurry for the filter molding operation if the loss of binder material within the filter effluent water will not be too great. However, the initial binder or added amounts thereof can be produced subsequently by a various common technique such as submersion of the unit within a solution of binder, spraying or the like means to impregnate the binder material through the unit.

The essentially fibrous body of this invention can normally be formed through usual techniques such as described above with sufficient porosity to enable easy fluid penetration and transfusion at relatively low pressure differentials, and to provide an optimum permeability of about 50–70% open area therethrough. However, if it is desired to increase the permeability or if conditions warrant it, pore forming fugitive filler material can be included constituting any material which may be introduced to occupy volume during formation and thereafter removed, as for example by being burned out with elevated temperatures or dissolved with a solvent. Low cost cellulosic materials such as kraft paper fiber or sawdust comprise typical thermally removable fugitive filler material. Also, suitable materials are those which may be completely sublimed at elevated temperatures such as methyl methacrylate, camphor or menthol.

The metal catalysts employed in this invention may comprise any metal exhibiting catalytic properties for the particular use. However, in typical applications platinum is the most common and preferred material, although palladium will frequently serve. Other possible catalytically active materials include nickel, cobalt oxide, molybdenum oxide and combinations and alloys thereof. Such metals may be chemically or vapor deposited, depending upon their respective properties, upon the fiber either prior to their formation into the composite body or preferably thereafter. For example, platinum or palladium can be deposited by application of a solution of chloroplatinic acid ($H_2PtCl_6$) or chloropalladic acid ($H_2PdCl_6$), evaporating the solvent and heating to about 450° C. to fix the metal on the fiber.

A typical product of this invention can be produced by mixing approximately equal parts by weight of asbestos fiber with alumina silica refractory fiber, such as Johns-Manville Corporation's Cerafelt, and including therewith about 10% by weight of the fiber content, of colloidal alumina solids such as Du Pont's Baymal, all dispersed in about 100 times their weight of water, and vacuum filter molding to produce a uniformly fitted composite fiber mixture having about 60% open area therethrough, in a unit thickness of about ¼ inch. This body is dried and heated to in excess of 250° C. to set the binder. Thereafter, the unit is saturated in a solution of the chloroplatinic acid, the water removed by evaporation to deposit the platinum, and the body heated to about 450° F. to set it on the fiber. The high surface area of the asbestos fiber content of the composite provides a highly effective substrate within the medium for the retention and concentration of the deposited platinum or other catalyst metal, while effective structural integrity is provided over all temperature conditions by the refractory fiber component of the composite.

I claim:

1. A fluid permeable composite fiber porous body for use in a catalytic oxidation burning unit for the combustion of carbonaceous fuel vapor, said body comprising an intimate admixture of asbestos fibers and ceramic siliceous fibers intermeshed with each other and bonded together with an inorganic binder and having a metal catalyst deposited thereon.

2. The porous body of claim 1, wherein the asbestos fibers are more concentrated within an area of the porous body adjacent a combustion surface thereof than in other portions of said body.

3. The porous body of claim 1, wherein the composite fiber porous body comprising an intimate admixture is backed with a section having a higher concentration of ceramic siliceous fibers than a combustion surface thereof.

4. The porous body of claim 1, wherein the metal catalyst is deposited on the fiber within an area of the porous body adjacent one surface therein comprising a surface which is to be exposed and provide the combustion surface.

5. The porous body of claim 1, wherein the metal catalyst is deposited on the fiber and is dispersed throughout the fluid permeable composite fiber porous body.

6. The porous body of claim 1, wherein the ceramic siliceous fiber consists of at least one member selected from the group consisting of silica fiber, divalent metal silicate fiber, and trivalent metal silicate fiber.

7. The porous body of claim 1, wherein the metal catalyst is a catalytically active metal for the oxidation of carbonaceous fuel vapor which consists of at least one member selected from the group consisting of platinum, palladium, nickel, cobalt oxide, molybdenum oxide, and alloys thereof.

8. The porous body of claim 1, wherein the ceramic siliceous fiber comprises alumina-silica fiber.

9. The porous body of claim 1, wherein the inorganic binder comprises colloidal alumina.

10. The porous body of claim 1, wherein the fluid permeable composite fiber porous body is of about 50–70% open area.

11. A method of forming a fluid permeable composite fiber porous body for use in a catalytic oxidation burning unit for the combustion of carbonaceous fuel vapor, wherein said body comprises an intimate admixture of asbestos fiber and ceramic siliceous fiber bonded together with an an inorganic binder and having a metal catalyst deposited thereon, said method including the steps of:
dispersing both asbestos fiber and ceramic siliceous fibers in water with an inorganic binder to produce a dilute slurry;
passing the water through a perforated mold to uniformly collect the fibers in an intermeshed fibrous layer together with at least some of the binder over a face of the mold to form said body;
heating said body to dry it and to set the binder;
saturating said body in a catalytic solution;
evaporating the water in the catalytic solution; and
heating said body to set the catalyst on the intermeshed asbestos and ceramic siliceous fibers.

12. A method of forming the porous body of claim 11 wherein said inorganic binder is colloidal alumina.

13. A method of forming the porous body of claim 11 wherein said catalytic solution is chloroplatinic acid.

14. A method of forming a fluid permeable composite fiber porous body for use in a catalyst oxidation burning unit for the combustion of carbonaceous fuel vapor, wherein said body comprises an intimate admixture of asbestos fiber and ceramic siliceous fiber bonded together with an inorganic binder and having a metal catalyst deposited thereon, said method including the steps of:
dispersing both asbestos fiber and ceramic siliceous fibers in about 100 times their weight of water with colloidal alumina solids about 10% of the weight of said fibers to produce a slurry;
pulling said water through a perforated mold by means of a vacuum to collect the fibers in an intermeshed fibrous layer together with colloidal alumina solids to form said body;
heating said body to a temperature in excess of 250° C. to dry said body and set the binder;

saturating said body in a solution of chloroplatinic acid;

evaporating the water in the solution of chloroplatinic acid to deposit platinum on the intermeshed asbestos and ceramic siliceous fibers; and heating said body to a temperature of about 450° F. to set the platinum on the intermeshed asbestos and ceramic siliceous fibers.

15. A method of forming the porous body of claim 14 wherein:

said slurry producing step includes producing a first slurry wherein the asbestos fiber content thereof is greater than the ceramic siliceous fiber content thereof and producing a second slurry wherein the asbestos fiber content thereof is less than the ceramic siliceous fiber content thereof; and said fiber collecting step includes:

first pulling water from said first slurry through the perforated mold to collect the fibers thereof in a first intermeshed fibrous layer against the mold; and secondly pulling water from said second slurry through the perforated mold to collect the fibers thereof in a second intermeshed fibrous layer against said first layer to form said body with a combustion surface having more asbestos fibers than ceramic siliceous fibers to enable the consolidation of the deposited platinum within or about said combustion surface of said body.

References Cited

UNITED STATES PATENTS

| | | | |
|---|---|---|---|
| 2,123,732 | 7/1938 | Keitel et al. | 252—460 |
| 2,341,995 | 2/1944 | Kipper | 252—459 X |
| 2,431,143 | 11/1947 | Schutte | 252—477 X |
| 3,264,226 | 8/1966 | Johnson | 252—458 X |
| 3,191,659 | 6/1965 | Weiss | 431—328 |
| 3,240,256 | 3/1966 | Binkley et al. | 431—328 X |
| 3,383,159 | 5/1968 | Smith, Jr. | 431—328 X |
| 3,441,359 | 4/1969 | Keith et al. | 431—328 |

CARL F. DEES, Primary Examiner

U.S. Cl. X.R.

252—459, 460, 477 R; 431—328